Patented Oct. 2, 1928.

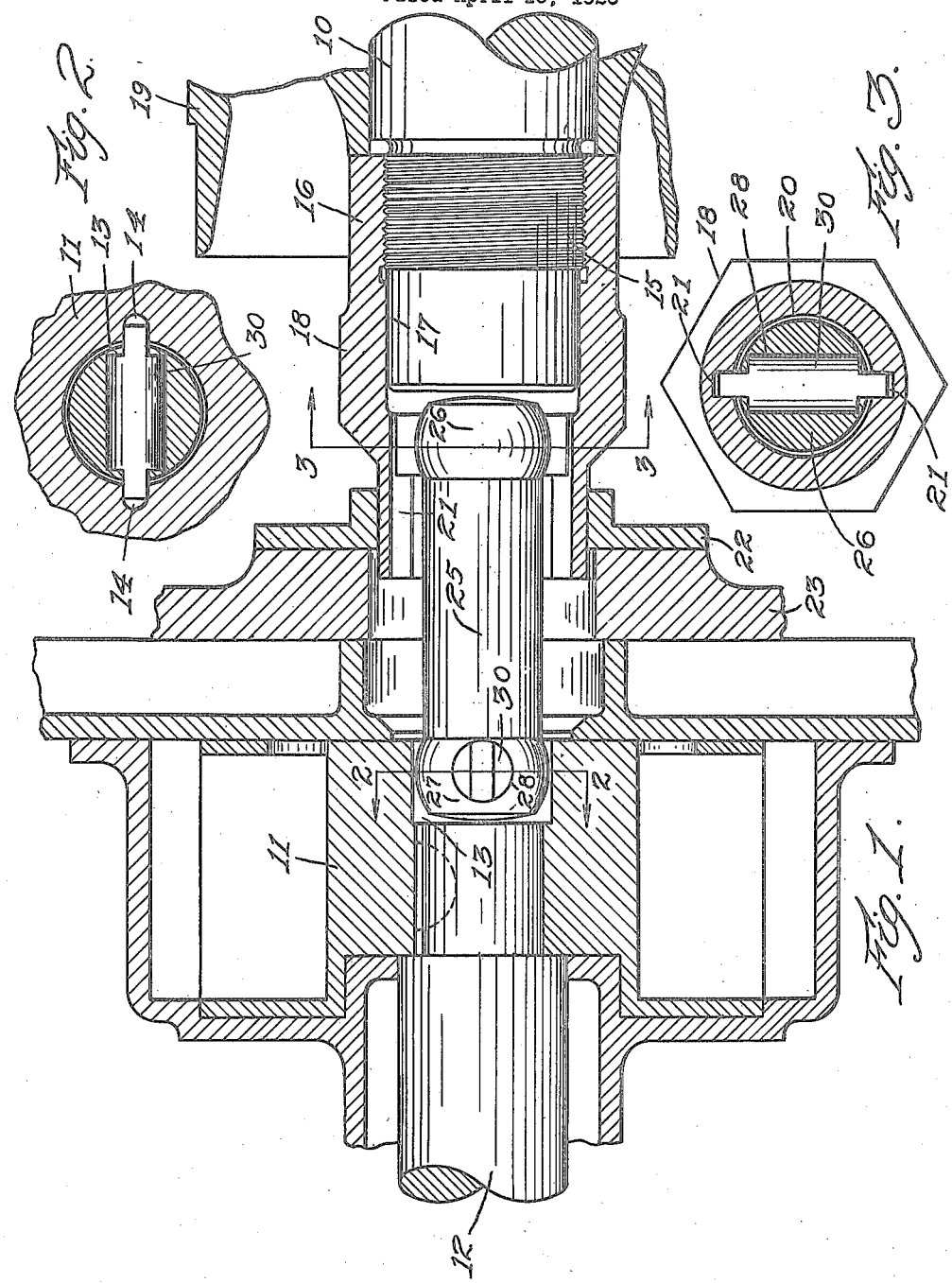

1,685,815

UNITED STATES PATENT OFFICE.

IRVING C. JENNINGS, OF SOUTH NORWALK, CONNECTICUT.

UNIVERSAL COUPLING.

Application filed April 13, 1926. Serial No. 101,829.

This invention relates to a universal coupling or driving connection by which rotary motion may be transmitted from a driving member to driven member without requiring exact alignment of said members for satisfactory and efficient operation.

It is the general object of my present invention to provide an improved form of universal coupling or driving connection for such purposes, which is of an improved and simplified construction and which may be easily and cheaply manufactured.

A further object is to provide a universal coupling which may be very easily assembled with the driving and driven members and which permits of considerable variation in the axial spacing of said members.

An important feature of the invention relates to the specific construction of certain of the parts, by which they may be easily reproduced by ordinary repair shop equipment, if one of these parts should be broken or lost on ship-board or in some other remote or inaccessible region.

My invention further relates to arrangements and combinations of parts which will be hereinafter described and more particularly pointed out in the appended claims.

A preferred form of the invention is shown in the drawings in which

Fig. 1 is a sectional plan view of portions of a water pump and an air pump operatively connected by my improved universal coupling;

Fig. 2 is a transverse sectional view at one end of the coupling member, taken along the line 2—2 in Fig. 1; and Fig. 3 is a similar view at the other end of the coupling member, taken along the line 3—3 in Fig. 1.

Referring to the drawings, I have shown my improved coupling member as connecting the impeller shaft 10 of a centrifugal water pump with the rotor 11 of a rotary air pump, which is indicated as being of the hydro-turbine type.

A shaft 12 supports the rotor 11 in suitable bearings but extends only partially through the hub of the rotor 11. A circular recess 13 is provided within the hub of the rotor, said recess 13 having axially extended slots 14 at each side thereof, which are preferably diametrically spaced.

The impeller shaft 10 of the centrifugal pump is preferably threaded as indicated at 15 to receive a threaded sleeve 16 closely fitting the cylindrical end portion 17 of the shaft. The sleeve 16 has a portion 18 formed as a nut by which the sleeve may be rotated to firmly seat it on the shaft. The sleeve 16 not only forms a portion of the universal coupling, but also preferably acts as a retaining device to hold the impeller 19 on the impeller shaft 10.

At its outer end, the sleeve 16 is provided with a cylindrical recess 20 (Fig. 3), which recess is provided with axially extended slots 21, which are also preferably diametrically opposed. The recessed portion of the sleeve 16 may project through a flanged plate or sealing member 22 into the casing 23 of the air pump.

The coupling member 25 preferably consists of a short shaft or rod having enlarged and partially spherical end portions 26 and 27. A transverse cylindrical opening 28 is provided in each head portion 26 or 27, and these recesses 28 are preferably disposed at right angles to each other, as indicated in Fig. 1.

A cylindrical driving pin 30 is rotatably mounted in each transverse recess 28 and the ends of each pin 30 are preferably slabbed off or flattened to slide freely in the slots 14 and 21.

When the parts are assembled as indicated in Fig. 1, the coupling member 25 is connected to the driving shaft 10 and sleeve 16 by a driving pin 30 in the head portion 26, and the coupling member is also connected to the driven member 11 by a second driving pin 30 in the head portion 27. These driving pins are freely slidable axially in the slots 14 or 21 but are held from circumferential movement in said driving and driven members. The coupling member 25 has free angular movement relative to the driving pins.

The construction of the slotted recess 20 in the end of the sleeve 16, instead of forming the recess directly in the end of the shaft 10, makes the device much simpler to repair in places where spare parts cannot be obtained. This type of coupling is largely used in pumps provided on ships for various purposes and it is particularly desirable that such pumps be easily repaired by the use of the meagre equipment usually found on shipboard.

While certain of the advantages of my invention might be attained by use of driving pins of the full size throughout their length and also by the use of driving pins having their axes parallel instead of perpendicular, I prefer the construction shown in the drawings which possesses substantial additional advantages.

Having thus described my invention and the advantages thereof, I do not wish to be limited to the details herein disclosed, otherwise than as set forth in the claim, but what I claim is:

A universal coupling for adjacent rotatable members comprising a sleeve secured upon and extending beyond the end of one of said members to form the circumferential wall of an axial recess and having opposed longitudinally disposed slots in said circumferential wall, said sleeve having its free end extending through a sealing member, of a casing in which said second rotatable member is mounted, and said second member also having an axial slotted recess, and a coupling member having cross pins seated in said slots and connecting said rotatable members, said sleeve having a nut shaped outer portion and a threaded inner portion engageable with said first member, whereby said sleeve may be rotated and moved axially of the coupling member.

In testimony whereof I have hereunto affixed my signature.

IRVING C. JENNINGS.